Dec. 7, 1943.   O. WITTEL ET AL   2,336,331
STEREOSCOPIC PICTURE
Filed Feb. 2, 1942
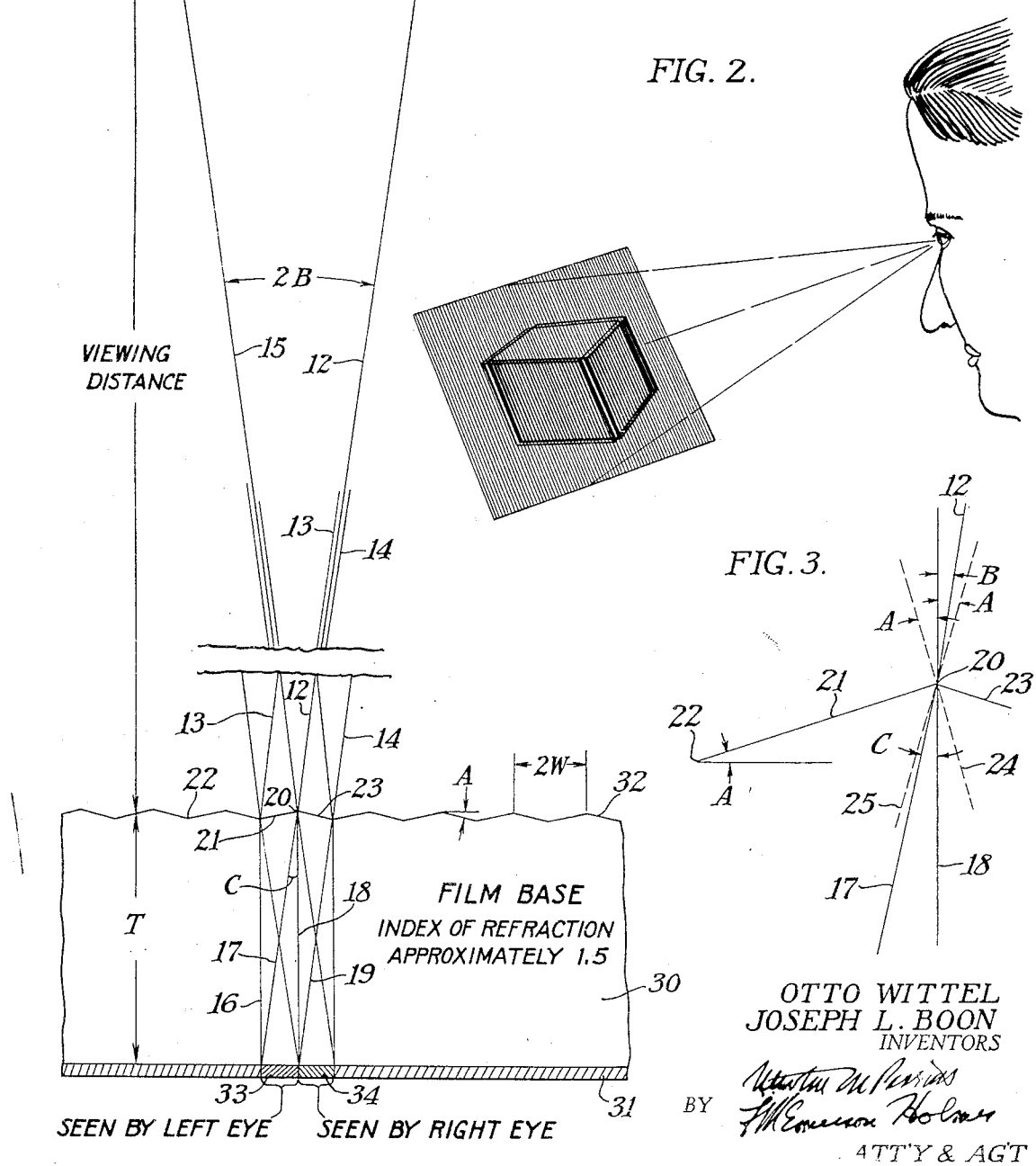
OTTO WITTEL
JOSEPH L. BOON
INVENTORS
ATT'Y & AGT Patented Dec. 7, 1943

2,336,331

UNITED STATES PATENT OFFICE 2,336,331

STEREOSCOPIC PICTURE

Otto Wittel and Joseph L. Boon, Rochester, N. Y., assignors to Eastman Kodak Company, Rochester, N. Y., a corporation of New Jersey Application February 2, 1942, Serial No. 429,233

5 Claims. (Cl. 88—1)

This invention relates to stereoscopic pictures and has for its object the provision of a film for presenting two stereoscopic pictures to the eyes of the observer without the assistance of additional viewing or projecting devices.

The pictures are preferably in the form of transparencies, but may be viewed by reflected light if provided with a white backing. Since the pictures are viewed through a transparent base, the backing is in the form of an overcoating for the image layer.

It is also an object of the invention to provide a sensitive film suitable for taking such pictures, that is, to provide a sensitive film which after processing will constitute a stereoscopic picture.

According to the invention a film for stereoscopic pictures to be viewed at a certain subtended binocular angle includes an image layer and a base for the layer. The subtended binocular angle is the angle subtended by the separation of the two eyes of the observer, i. e. the interocular separation, at the film. Obviously, this angle depends on the viewing distance and the exact relationships therefor will be discussed later. The image is viewed through the base, which may be the actual film base used for the image layer or may be a separate transparent sheet superposed on the image layer. Also, additional supports such as opaque white paper supports may be provided for the image layer on the opposite side to this "base." However, since the preferred embodiment of the invention has the image layer carried by the transparent sheet which incorporates the optical means for distinguishing the stereo images, this sheet is referred to as the "base." The back, i. e. the side opposite to the image layer, of the base is provided with prismatic corrugations. These are not to be confused with the cylindrical lenticulations previously employed in stereo and in color pictures. These corrugations are thought of as thin prisms base to base whose width is equal to one-half the pitch of the corrugations and whose prism angle is the angle between the surface of the corrugation and the plane of the transparent sheet or of the image layer. According to the preferred embodiment of the invention the prism angle A must be such that tan A substantially equals $$\frac{\sin B}{N \cos B}$$

where B is one-half the subtended binocular angle and N is the index of refraction of the transparent base. The width of each of the prisms depends also on the thickness of the base. The angle subtended by the width of one prism at the image layer is referred to as the pitch angle of the prism or more specifically the through-base-pitch-angle of the prisms. If this angle is C, sin(A−B) must essentially equal $$\frac{1}{N \sin (A-C)}$$

Obviously, the prism width divided by the base thickness equals the tangent of this angle C.

The terms used in the description of the invention, further objects of the invention and specific examples thereof are given below in connection with the accompanying drawing in which;

Fig. 1 is a vertical cross section partly enlarged illustrating the invention when the film is held horizontally.

Fig. 2 is a perspective view illustrating the most convenient form of the invention.

Fig. 3 is a greatly enlarged section of Fig. 1 illustrating the details of the invention.

In Fig. 1, the portion showing the film itself is enlarged relative to the remainder of the figure. The separation of the right eye 10 and the left eye 11 is referred to as the interocular separation and the angle subtended by this separation at the film is defined as 2B, the subtended binocular angle. Obviously, this depends on the distance from the eye to the film which is referred to as the viewing distance D and $$\tan B = \frac{S}{2D}$$

The light rays reaching the left eye are labeled 12, 13, and 14, and from these rays as seen in the two parts of this Fig. 1 it is easy to see the degree of magnification intended. Since all of the light between the rays 12 and 13 passes through the refractive surface 21 of one prismatic corrugation, it is all refracted by this surface 21 so that it must come from the section 33 of the image layer, i. e. must be between the rays 16 and 18. Similarly, all the light between the rays 12 and 14 must pass through the refractive surface 23 and, hence, must be defined by the rays 17 and 19 as also coming from the section 33 of the image layer 31. Thus the left eye sees only the section 33 of the image layer and is prevented from seeing the section 34. Furthermore, all parts of the surface 32 of the film base 30 appear bright to each of the eyes. This gives quite pleasing results entirely free of dark lines, distortion, etc. However, slight deviations from this perfect set of conditions such as having a narrow unused black line between areas 33 and 34, can be tolerated.

The relationship between the various angles is best illustrated in Fig. 3 which shows greatly enlarged the relative positions of the rays and surfaces at the point 20 which is the point of intersection of the two refractive surfaces 21 and 23.

Since the film is considered to be horizontal, the prism angle of the corrugation is the angle A between the surface 21 and the horizontal at the point 22, or at any other point for that matter. Since the line 18 is drawn vertically and the broken line 24 is drawn at right angles to the surface 21, the angle between these lines 18 and 24 is also A as indicated. Similarly, the line 25 is drawn perpendicular to the surface 23 and the angle between the lines 24 and 25 is 2A. The angle between the ray 12 and the vertical 18 is one-half the subtended binocular angle, i. e., is the angle B. For convenience, the ray 12 is considered as coming either through the surface 21 or the surface 23, although in practice the actual rays through these two surfaces are slightly to the left or right of the ray 12.

Since, as seen in Fig. 1, there must be no overlapping of the areas 33 and 34 of the image layer and since the ray 18 is the dividing line between these two sections and further since it is not desirable to leave unused areas between the sections 33 and 34, the light from the section 33 traveling by the ray 18 as it passes through the surface 21 must be so refracted as to constitute the ray 12. Therefore, according to the law of refraction, the sin of the angle between the perpendicular 24 and the ray 12 must be N times the sin of the angle between this perpendicular 24 and the ray 18. That is, $\sin(A+B) = N \sin A$. Since B is fixed as soon as the viewing distance is selected by any particular observer, and since it is practically the same for all normal observers, this defines the angle A, i. e. the prism angle of the corrugations.

Since $\sin(A+B) = \sin A \cos B + \cos A \sin B$, $$\tan A = \frac{\sin B}{N - \cos B}$$

Similarly, the ray 17 coming from the opposite side of the area 33 to the point 20, as refracted by the surface 23 must constitute the ray 12. Applying the law of refraction with respect to the normal 25 to the surface 23;

$$\sin(A-B) = N \sin(A-C)$$

Since A and B are already determined, this fixes the value for the angle C. Furthermore, since the tangent of this angle is $W/T$, where W is the width of the prisms and T is the thickness of the film base, this determines the necessary width of each prism for any particular film base.

Of course, if some observer has a wider than normal interocular separation, he would have to view the film at a slightly greater viewing distance. Also, the areas of the image near the edge of the film do not have quite the simplified relationships discussed in connection with the one right below the eyes of the observer, but the equivalent is true and in practice it has been found that the desired effect is obtained even though each of the values are only approximately those just defined.

The index of refraction N is approximately 1.5 for most materials such as plastics, ordinary film bases, glass, etc. The pitch of the prisms is twice the width of each prism as is obvious from the drawing. The subtended binocular angle is not critical and is fully defined above. The prism angle is the angle between the prism surfaces and the surface orthogonal to the line of view. It is not to be confused with the complementary angle between the prism surfaces and the vertical. The difference in thickness of the film base between the top and bottom of the prisms is so small as to be negligible.

By way of example, it is pointed out that a customary viewing distance for hand size prints is about 12 inches. Interocular separation may be taken as 2½ inches, which makes the angle B equal to about 6 degrees. That is, tan of 6° approximately equals 1.25/12. If a film base is selected having an index of refraction about 1.5, the above-discussed relationships between the angle A and the angle B, requires that A equal 11° 41'. Using this value for the angle A, the above equation gives a value for the angle C equal to 7° 51'. Since the tangent of 7° 51' is .1379, the width of the prism corrugations should be .1379 times the thickness of the film. These values are all more exact than necessary in practice, especially since the viewing distance is varied by the observer when he looks at the film. In general, with a viewing distance of about 12 inches and an index of refraction about 1.5, the prism angle should be about 12° and the prism width should be about .14 times the thickness of the film. For example, if the film base is .01 inch thick, the prism width should be a little less than .0015.

If the image is to be viewed by reflected light, paper or other white support is positioned below the layer 31 shown in Fig. 1, and when this separate support is provided, it is not absolutely necessary to have adhesion between the layer 31 and the base 30, but obviously for ease in maintaining register some holding means is preferable.

For taking pictures the same film is provided with the layer 31 photosensitive. It is mounted in the film plane of a bilens camera with the corrugated surface facing the lenses and the lenses in a position equivalent to the eyes 10 and 11. If exaggerated stereo is desired the lenses are farther apart and since they must be on the lines 12 and 15, they must be at a greater distance from the film and have longer focal length. Contrariwise if short focal length lenses are used they must be closer together and hence reduced stereo results. Thus Fig. 1 with lenses in place of elements 10 and 11 and the layer 31 sensitive, is the illustration of the taking arrangement.

Having thus described the preferred form of our invention, we wish to point out that it is not limited to this form but is of the scope of the appended claims.

What we claim and desire to secure by Letters Patent of the United States is:

1. A film for stereoscopic pictures to be viewed at a subtended binocular angle 2B comprising a thin image layer and, for the layer, a thin transparent base of index of refraction N, the back of the base being prismatically corrugated with prisms having a prism angle A and a through-base-pitch-angle C where tan A substantially equals $$\frac{\sin B}{N - \cos B}$$

and $\sin(A-C)$ substantially equals $$\frac{\sin(A-B)}{N}$$

and with alternate prisms wedged in opposite directions to be successively base to base and edge to edge across the film.

2. A film for taking stereoscopic pictures in a two-lens camera having a subtended bilens angle 2B and to be viewed at the same subtended binocular angle, comprising a thin sensitive image layer and, for the layer, a thin transparent base of index of refraction N, the back of the base being prismatically corrugated with prisms having a prism angle A and a through-base-pitch angle C where tan A substantially equals $$\frac{\sin B}{N - \cos B}$$

and sin $(A-C)$ substantially equals $$\frac{\sin (A-B)}{N}$$

and with alternate prisms wedged in opposite directions to be successively base to base and edge to edge across the film.

3. A film for stereoscopic pictures to be viewed at a subtended binocular angle 2B comprising a thin image layer and, for the layer, a thin transparent base of thickness T and index of refraction N, the back of the base being prismatically corrugated with prisms of base width W and prism angle A where tan A substantially equals $$\frac{\sin B}{N - \cos B}$$

and sin $(A-B)$ equals N sin $(A-C)$ and tan C equals $W/T$, and with alternate prisms wedged in opposite directions to be successively base to base and edge to edge across the film.

4. A film to be viewed at a viewing distance D comprising a thin image layer and, for the layer, a thin transparent base of index of refraction N, the back of the base being prismatically corrugated with prisms having a prism angle A and a through-base-pitch angle C where tan A equals $$\frac{\sin B}{N - \cos B}$$

and D tan $B$ = one-half the interocular separation and N sin $(A-C)$ substantially equals sin $(A-B)$, and with alternate prisms wedged in opposite directions to be successively base to base and edge to edge across the film.

5. A film to be viewed at a viewing distance of about 12 inches comprising a thin image layer, and for the layer, a thin transparent base of thickness T and index of refraction about 1.5, the back of the base being prismatically corrugated with prisms having a prism angle about 12° and a prism width about .14T, and with alternate prisms wedged in opposite directions to be successively base to base and edge to edge across the film.

OTTO WITTEL.
JOSEPH L. BOON.